United States Patent [19]
Hirota et al.

[11] Patent Number: 4,552,930
[45] Date of Patent: Nov. 12, 1985

[54] VISBROKEN PROPYLENE-ETHYLENE RANDOM COPOLYMERS, PROCESS AND FILMS

[75] Inventors: Kiwami Hirota; Hideki Tamano; Fumio Sakaguchi, all of Oita, Japan

[73] Assignee: Showa Denko Kabushiki Kaisha, Tokyo, Japan

[21] Appl. No.: 408,479

[22] Filed: Aug. 16, 1982

[30] Foreign Application Priority Data

Aug. 22, 1981 [JP] Japan .............................. 56-130855
Sep. 4, 1981 [JP] Japan .............................. 56-138317
Apr. 20, 1982 [JP] Japan .............................. 57-64654
Apr. 20, 1982 [JP] Japan .............................. 57-64655
Jul. 2, 1982 [JP] Japan .............................. 57-114057

[51] Int. Cl.$^4$ .............................................. C08F 8/06
[52] U.S. Cl. ................................ 525/333.8; 525/387; 526/348
[58] Field of Search ........................... 526/348, 914; 525/333.8

[56] References Cited

U.S. PATENT DOCUMENTS 3,243,405 3/1966 Boyer et al. ...................... 525/333.8
3,287,342 11/1966 Walton ............................... 526/914

Primary Examiner—Paul R. Michl
Attorney, Agent, or Firm—McAulay, Fields, Fisher, Goldstein & Nissen

[57] ABSTRACT

A visbroken propylene-ethylene random copolymer and process for the manufacture thereof having the following characteristics:

(a) a melting point of 115° C. to 140° C.;
(b) an ethylene content, determined by the $C^{13}$-NMR method, of 6 to 20 mol %;
(c) a block index, calculated according to the $C^{13}$-NMR method, of 1.1 or less;
(d) an MFI, determined at 230° C. under a load of 2.16 kg, of 015 to 100 g/10 min; and
(e) a ratio of the MLMFI, determined at 230° C. under a load of 10.0 kg, to the MFI, determined at 230° C. under a load of 2.16 kg, of 10 to 16, the random copolymer being prepared by visbreaking, in the presence of a peroxide, a propylene-ethylene random copolymer having an MFI, determined at 230° C. under a load of 2.16 kg, of 0101 to 0.3 g/10 min; and this random copolymer has a low melting point, and a film can be molded therefrom.

6 Claims, 2 Drawing Figures

VISBROKEN PROPYLENE-ETHYLENE RANDOM COPOLYMERS, PROCESS AND FILMS

The present invention relates to a novel propylene-ethylene random copolymer having a low melting point, an excellent transparency and moldability, and an excellent impact resistance and heat sealability. The present invention also relates to a production process of the above-mentioned propylene-ethylene random copolymer and to a composition and various films derived therefrom.

The copolymerization of propylene and ethylene and/or other olefins is one of the methods to improve the transparency and low-temperature characteristics (e.g., impact resistance at a low temperature) of polypropylene film. Recently, linear-type low-density polyethylene (hereinafter referred to as "LLDPE") has been developed as a new material in the film field. Linear-type low-density polyethylene film is transparent and has low-temperature characteristics. To compete with LLDPE film, polypropylene film has been urged to improve transparency and low temperature characteristics. With these improved properties, Polypropylene film might be superior to LLDPE film because of its inherent thermal resistance and higher Young's modulus.

Various methods have been proposed for improving the low-temperature characteristics of polypropylene films. For instance, a propylene-ethylene block copolymer is one of the methods to improve the low-temperature characteristics of polypropylene films. However, the use of this block copolymer results in an adverse decrease in the transparency of the resultant films and, therefore, this method cannot be applied in the production of transparent films. Another method is to increase the ethylene content of a propylene-ethylene random copolymer. An increase in the content of ethylene or other comonomers of the copolymer, however, results in an increase of the soluble portion of the copolymer in a polymerization solvent or in the purification solvent. An increase in solubility causes a buildup of the polymer on the inner surface of the polymerization reactor, an increase in the production cost due to an increase of atactic polypropylene, difficulty in separating the copolymer from a purification solvent due to swelling of the copolymer in the purification solvent, insufficient drying of the copolymer, agglomeration of the copolymer particles, and difficulty in the transportation of polymer powder. For these reasons, the allowable ethylene content of propylene-ethylene random copolymers is limited for the commercial production. That is, propylene-ethylene copolymers having an ethylene content of about 5% by weight (7.3 mol %) or more and a melting point of 140° C. or less cannot be commercially produced.

In order to partially eliminate the above-mentioned disadvantages, polymerization at an extremely low temperature or terpolymerization of propylene-ethylene butene has been proposed. However, the former results in an undesirably large decrease in polymerization activity and in a very little effects. The latter requires a relatively large amount of butene to decrease the melting point since a higher olefin such as butene is less effective for decreasing the melting point. For instance, two or three times by weight of butene is required, compared with ethylene to decrease the melting point. This greatly increases the production cost of the copolymer. Furthermore, at the most, only a 2° C. or 3° C. decrease in the melting point can be accomplished by means of this method without adverse change in the production process.

OBJECTS OF THE INVENTION

Accordingly, the objects of the present invention are to eliminate the above-mentioned disadvantages of the prior art and to provide a novel propylene-ethylene random copolymer having a relatively low melting point and to provide a film having an excellent transparency and moldability, and an excellent impact resistance, especially at a low temperature, and low-temperature heatsealability (e.g., about 125° C. or less).

Another object of the present invention is to provide a process for producing the above-mentioned propylene-ethylene random copolymer.

A further object of the present invention is to provide a water-cooling tubular film, a T-die cast film, and a composite film composed of the above-mentioned propylene-ethylene copolymer and having an excellent transparency, impact strength, and heat sealability.

Other objects and advantages of the present invention will be apparent from the following description.

SUMMARY OF THE INVENTION

In accordance with the present invention, there is provided a propylene-ethylene random copolymer having the following characteristics:
(a) a melting point of 115° C. to 140° C.;
(b) an ethylene content, determined by the nuclear magnetic resonance ($C^{13}$-NMR) method, of 6 to 20 mol %;
(c) a block index, calculated according to the $C^{13}$-NMR method, of 1.1 or less;
(d) melt flow index (MFI), determined at 230° C. under a load of 2.16 kg, of 0.5 to 100 g/10 min; and
(e) a ratio of the melt flow index (MLMFI), determined at 230° C. under a load of 10.0 kg, to the MFI, determined at 230° C. under a load of 2.16 kg, of 10 to 16.

In accordance with the present invention, there is also provided a process for producing a propylene-ethylene random copolymer comprising of steps of:
copolymerizing propylene and ethylene in the presence of a Ziegler-type catalyst to form a random copolymer having an MFI, determined at 230° C. under a load of 2.16 kg, of 0.01 to 0.3 g/10 min; and
visbreaking the resultant copolymer in the presence of a peroxide to form a random copolymer having the following characteristics:
(a) a melting point of 115° C. to 140° C.;
(b) an ethylene content, determined by a $C^{13}$-NMR method, of 6 to 20 mol %;
(c) a block index, calculated according to the $C^{13}$-NMR method, of 1.1 or less;
(d) an MFI, determined at 230° C. under a load of 2.16 kg, of 0.5 to 100 g/10 min; and
(e) a ratio of the MLMFI, determined at 230° C. under a load of 10.0 kg, to the MFI, determined at 230° C. under a load of 2.16 kg, of 10 to 16.

In accordance with the present invention, there is further provided a water-cooling tubular film derived from a propylene-ethylene random copolymer having the following characteristics:
(a) a melting point of 115° C. to 140° C.;
(b) an ethylene content, determined by the $C^{13}$-NMR method, of 6 to 17 mol %;

(c) a block index, calculated according to the method, of 1.1 or less;
(d) an MFI, determined at 230° C. under a load of 2.16 kg, of 1 to 30 g/10 min, desirably 1 to 30 g/10 min
(e) a ratio of the MLMFI, determined at 230° C. under a load of 10.0 kg, to the MFI, determined at 230° C. under a load of 2.16 kg, of 10 to 16.

In accordance with the present invention, there is still further provided a T-die cast film derived from a propylene-ethylene random copolymer having the following characteristics:
(a) a melting point of 115° C. to 140° C.;
(b) an ethylene content, determined by the $C^{13}$-NMR method, of 6 to 15 mol %, desirably 6 to 15 mole %;
(c) a block index, calculated according to the $C^{13}$-NMR method, of 1.1 or less;
(d) an MFI, determined at 230° C. under a load of 2.16 kg, of 0.5 to 50 g/10 min, desirably 0.5 to 50 g/10 min; and
(e) a ratio of the MLMFI, determined at 230° C. under a load of 10.0 kg, to the MFI, determined at 230° C. under a load of 2.16 kg, of 10 to 16.

In accordance with the present invention, there is still further provided a composite film composed of at least two layers; a first layer consists of crystalline polypropylene and a second layer is laminated on one or both sides of the first layer, said second layer comprising a propylene-ethylene random copolymer having the following characteristics:
(a) a melting point of 115° C. to 135° C.;
(b) an ethylene content, determined by the $C^{13}$-NMR method, of 10 to 17 mol %;
(c) a block index, calculated according to the $C^{13}$-NMR method, of 1.1 or less;
(d) an MFI, determined at 230° C. under a load of 2.16 kg, of 1 to 60 g/10 min; and
(e) a ratio of the MLMFI, determined at 230° C. under a load of 10.0 kg, to the MFI, determined at 230° C. under a load of 2.16 kg, of 10 to 16.

BRIEF DESCRIPTION OF THE DRAWINGS

The present invention will be better understood from the description set forth below with reference to the accompany drawing, wherein.

DEFINITIONS

The term "melting point" of the copolymer used herein is defined as follows:

A copolymer sample is preheated at a temperature of 230° C. for 5 minutes and is pressed for 5 minutes under a pressure of 50 kg/cm² in a press and for 5 minutes at a temperature of 25° C. to 30° C. under a pressure of 100 kg/cm² in a cooling press. Thus, a film having a thickness of 100 to 1000 μm is obtained. The film is maintained at a temperature of 500° K. for 5 minutes in a DSC pan (type II manufactured by Perkin-Elmer Co.) and is cooled at a rate of 20° C./min to a temperature of 323° K. The film is maintained at a temperature of 323° K. for 5 minutes and then is heated at a rate of 20° C./min. The melting point (Tm) is defined as the temperature of the endothermic peak obtained as a result of heating at a rate of 20° C./min.

The "ethylene content (mol %)" of the copolymer used herein is defined as follows:

A copolymer sample is dissolved in a mixture of 1,2,4-trichlorobenzene (1.5 ml) and perdeutereobenzene (0.5 ml). A NMR spectrum is recorded on a JEOL pulsed Fourier transform NMR spectrometer operating at 25.05 MHz. The measurement conditions are detailed in the following:

| | |
|---|---|
| Observation width | 1800 Hz |
| Pulse width | 6μ (45° pulse) |
| Pulse interval | 3 s |
| Integrated times | 10,000 or more |
| Determination temperature | 100° C. |

The ethylene content is calculated form the areas of the peaks.

The "block index" of the copolymer used herein is defined as follows:

The monomer sequence of a copolymer sample is defined by the triad of monomer sequence by using $C^{13}$-NMR, and the block index is calculated from the following equation:

$$\text{Block index} = \frac{\frac{(100) + (000)}{(101) + (100) + (000)} \times 100}{100 - (100 - C_E)^2}$$

wherein "0" is an ethylene unit, "1" is a propylene unit, and "$C_E$" is the ethylene content (mol %). That is, (000) represents an ethylene block formed by three ethylene units linked together and (100) represents an ethylene block formed by two ethylene units linked together.

The "MFI" of the copolymer used herein is defined by a melt flow index according to the Japanese Industrial Standards (JIS)-K-6758 method and is determined at a temperature of 230° C. under a load of 2.16 kg. The "MLMFI" of the copolymer used herein is defined by an MFI according to the JIS-K-6758 method and is determined at a temperature of 230° C. under a load of 10.0 kg.

DISCLOSURE OF BEST MODES

According to the present invention, propylene-ethylene random copolymers are provided to satisfy desired properties such as low-temperature properties, impact resistance, better transparency, tear resistance, especially in the longitude direction, thermal resistance, higher Young's modulus, and better moldability.

According to the present invention, propylene is first copolymerized with a relatively higher content of ethylene to produce copolymers having MFI of 0.01 to 0.3 g/10 min (i.e., a relatively high molecular weight) and then the visbreaking of the resultant copolymers is carried out in the presence of a peroxide to form copolymers having a relatively narrow molecular weight distribution and a relatively high ethylene content without any of the difficulties in the prior art processes.

We have unexpectedly found that the copolymer film produced by the present invention has higher impact resistance than the conventional copolymer film at the same MFI value and ethylene content.

Figure 1:
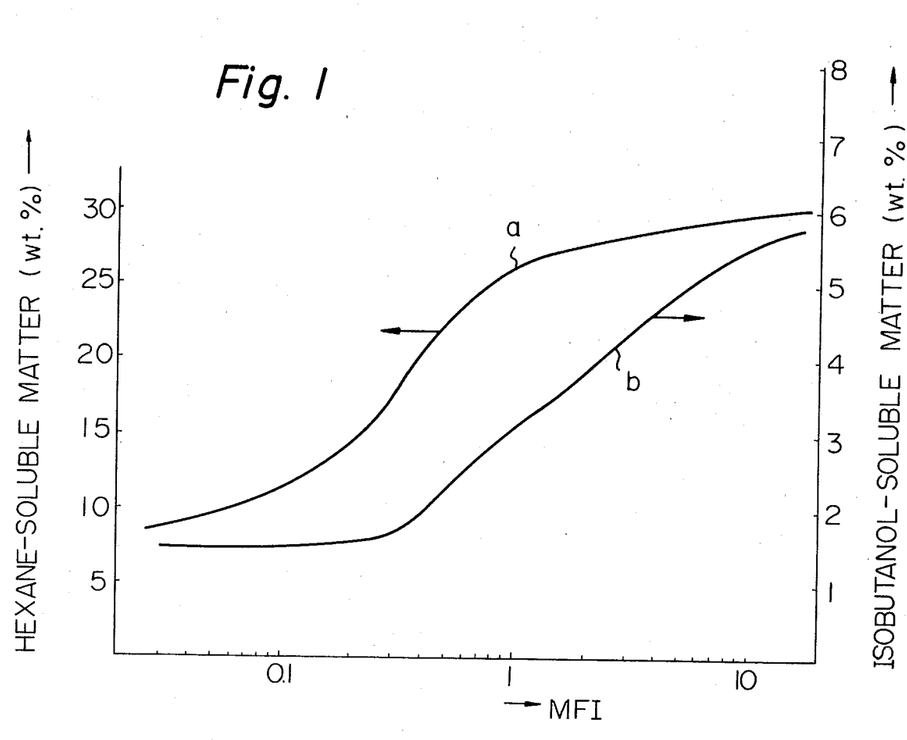
FIG. 1 is a graph illustrating the corelation between the MFI of the propylene-ethylene random copolymer of the present invention containing 13.3 mol % of ethylene and a hexane-soluble percent (see curve a) or an isobutanol soluble percent (see curve b)
Figure 2:
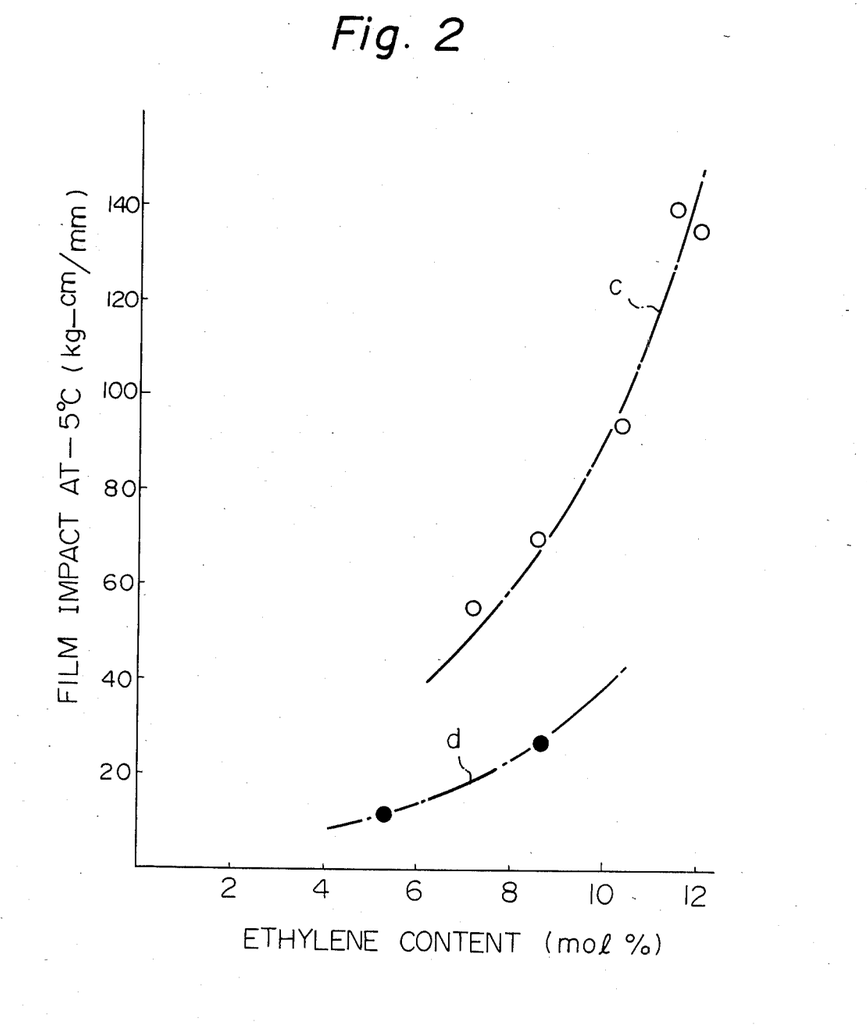
FIG. 2 is a graph illustrating the corelation between the film impact and the ethylene content of the present copolymer (see curve c) and the film impact and the ethylene content of conventional propylene-ethylene copolymer.

We have also found that propylene-ethylene copolymers having a high molecular weight (e.g., having a MFI of 0.3 g/10 min or less) have less solubility in polymerization solvents and purification solvents as compared with those having a higher MFI. For instance, the changes in the solubility of propylene-ethylene copolymers having various MFIs in hexane (a typical polymerization solvent) and isobutanol (a typical purification solvent) are shown in FIG. 1. As is clear from curves a and b of FIG. 1, the solubility of propylene-ethylene copolymers in hexane (see curve a) and isobutanol (see curve b) is remarkably decreased at a region of the MFI of 0.3 g/10 min or less. Furthermore, we have found that even when the molecular weight of the copolymers is increased the molecular weight of the component dissolved in isobutanol used as a purification solvent is not increased. Accordingly, the copolymer slurry during copolymerization and the copolymer-alcohol slurry during the purification step do not become viscous, and, therefore, solid-liquid separation is easy and neither agglomeration of the copolymers nor clogging in the drying and transportation steps occurs. However, these copolymers having an MFI of 0.3 g/10 min or less are not suitable for use in conventional types of pelletizing and molding such as injection molding and film molding since the high molecular weight of the copolymers make pelletizing or molding impossible.

We have, however, found that propylene-ethylene copolymers having MFI of 0.3 g/10 min or less can be pelletized at a temperature of 180° C. to 300° C. while the copolymers are visbroken by adding thereto peroxides to produce moldable propylene-ethylene copolymers having a low melting point. The MFI of the resultant copolymers can be controlled by the amount of peroxides added.

The Ziegler-type catalysts usable in the production of propylene-ethylene copolymers having an MFI of 0.01 to 0.3 g/10 min are known catalysts conventionally used in the polymerization of isotactic polypropylene. These catalysts comprise a transition-metal compound component and an organometallic compound component. Typical examples of the transition-metal compounds are trivalent and/or tetravalent titanium compounds and composite titanium compounds modified by organic or inorganic compounds such as composites comprising halogen-containing titanium compounds, magnesium compounds, and electron donor compounds (optionally) and titanium trichloride eutectoids.

Examples of the organometallic compounds are: trialkyl aluminum such as triethyl aluminum and triisobutyl aluminum; and dialkyl aluminum halides such as diethyl aluminum monochloride and diisobutyl aluminum monobromide.

Examples of typical combinations of Ziegler-type catalysts are:
1. A combined catalyst of AA grade titanium trichloride and diethyl aluminum monochloride.
2. A combined catalyst of the above-mentioned catalyst (1) and an electron donor compound.
3. The above-mentioned catalysts (1) and (2) of which the titanium trichloride component is treated with an electron donor compound.
4. A combined catalyst containing as a titanium component a β-type titanium trichloride treated with an electron donor.
5. A combined catalyst obtained by combining a composite comprising an electron donor compound, a tetravalent titanium compound, a magnesium compound, and a trialkyl aluminum compound with an aromatic ester.

However, it should be noted that any known catalysts usable in the formation of a crystalline polypropylene can be used in the present invention.

The propylene-ethylene random copolymers having an MFI of 0.01 to 0.3 g/10 min can be produced continuously or batchwise by using one or more reactors. Copolymerization can also be carried out at multiple stages in which hydrogen concentrations and/or comonomer concentrations may be different. Any conventional reactors can be used in the copolymerization of propylene and ethylene according to the present invention but a pipe loop-type reactor is especially desirable since a high agitation speed can be readily achieved, and, as a result, buildup of the polymer on the inner wall of the reactor is minimized.

Furthermore, according to the present invention, a small amount of olefin having the general formula:

$$CH_2=CHR$$

wherein R is an alkyl group having 2 to 10 carbon atoms can be copolymerized with propylene in addition to ethylene. Examples of such olefins are butene-1, 4-methylpentene-1, hexene-1, and octene-1. These olefins can be used alone or in any mixture thereof. The total amount of ethylene and the other olefins used in the present invention is not more than 15% by weight. It is very difficult to commercially produce the random copolymer containing more than 15% by weight of ethylene and the other olefins because of its high content of soluble portion at the polymerization step.

The random copolymerization of propylene and ethylene and, optionally, the above-mentioned olefins can be carried out by either a slurry polymerization method using a liquid monomer solvent or an inert hydrocarbon solvent such as hexane, heptane, or kerosine or a vapor phase polymerization method at a temperature of from room temperature to 100° C., desirably 40° C. to 70° C. Desirably, copolymerization is carried out at a slurry state in a hydrocarbon solvent having a boiling point of 70° C. or less. The use of a liquid monomer as a solvent is especially desirable because the polymerization activity is higher and the amount of the soluble fraction of the copolymers is less than the others. The MFI of the copolymers can be controlled by using a chain transfer agent such as hydrogen. Copolymers having an MFI of more than 0.3 g/10 min tend to dissolve the significant amount of copolymers in the polymerization and/or purification solvent. Furthermore, the resultant copolymer film does not show enough impact resistance, if copolymers having an MFI of more than 0.3 g/10 min is visbroken. On the other hand, copolymers having an MFI of less than 0.01 g/10 min cannot be expected a further improvement in decreasing the amount of soluble portion of the copolymers in the solvent and make it difficult to achieve homogeneous visbreaking. Furthermore, copolymers having an MFI of less than 0.01 g/10 min require a large amount of the peroxide.

The visbreaking of the above-mentioned copolymers having an MFI of 0.01 to 0.3 g/10 min can be carried out in the presence of a peroxide at a temperature of 180° C. to 300° C., desirably 220° C. to 270° C., by using a conventional single- or twin-screw extruder.

The peroxides applicable to the visbreaking of the above-mentioned copolymers are those having a decomposition half-life time of more than one second at the melting point of the copolymers (e.g., 115° C. to 140° C.) and less than 10 minutes at a temperature of 300° C. Homogeneous visbreaking cannot be achieved with the use of a peroxide having a decomposition half-life time not within the above-mentioned range. Examples of organic peroxides usable in the visbreaking of the above-mentioned copolymers are: hydroperoxides such as t-butyl hydroperoxide and cumene hydroperoxide; dialkyl peroxides such as dicumyl peroxide, 2,5-dimethyl-2,5-di(t-butylperoxy)hexane, and 2,5-dimethyl-2,5-di(t-butylperoxy)hexane-3; diacyl peroxides such as lauroyl peroxide and benzoyl peroxide; peroxy esters such as t-butyl peroxyacetate and t-butyl peroxylaurate; ketone peroxides such as methyl ethyl ketone peroxide and methyl isobutyl ketone peroxide; peroxy dicarbonates such as diisopropyl peroxy dicarbonate; and silicon peroxides such as vinyl tris(t-butylperoxy) silane. Furthermore, azo compounds having the above-mentioned decomposition rate can also be used in the present invention. Examples of such compounds are azobisisobutyronitrile and 2,2'-azobis (2,4-dimethyl valeronitrile). Alkali or alkaline earth metal peroxide can also be used in the present invention.

The amount of the peroxide to be added to the copolymer is varied widely depending upon the desired MFI of the product and the molecular weight of the starting copolymer. Usually, the peroxide is used in an amount of 0.002 to 0.5 parts based on 100 parts by weight of the starting copolymer. In addition to the peroxide, conventional additives such as antioxidants, lubricants, ultraviolet light absorbers, coloring agents or pigments, anti-blocking agents, and antistatic agents can be used.

The peroxide and the other optional additives can be dry blended with the copolymer by using a conventional mixer or blender, followed by extruding the mixture under conventional extruding conditions. Alternatively, the peroxide and the other optional additives can be directly added to the extruder.

Thus, the desired propylene-ethylene random copolymers having the following characteristics can be obtained:
1. A melting point of 115° C. to 140° C.
2. An ethylene content, determined by the $C^{13}$-NMR method, of 6 to 20 mol %.
3. A block index, calculated according to the $C^{13}$-NMR method, of 1.1 or less.
4. An MFI, determined at 230° C. under a load of 2.16 kg, of 0.5 to 100 g/10 min.
5. A ratio of the MLMFI, determined at 230° C. under a load of 10.0 kg, to the MFI, determined at 230° C. under a load of 2.16 kg, of 10 to 16.

A copolymer having a melting point of lower than 115° C. cannot be produced commercially even by the present invention. Contrary to this, a copolymer having a melting point of higher than 140° C. cannot show excellent impact resistance at a low temperature.

An ethylene content of less than 6 mol % results in an undesirable decrease in the low-temperature properties and in heat sealability at a low temperature.

A block index of more than 1.1 causes an undesirable decrease in transparency, when the film is molded from the copolymer.

An MFI of less than 0.5 g/10 min results in an undesirable moldability. Contrary to this, an MFI of more than 100 g/10 min results in difficulty in pelletizing the copolymer.

A copolymer having a ratio of MLMFI/MFI of more than 16 cannot sufficiently show the desired excellent properties, such as the excellent transparency, a better low-temperature impact strength, and anti-blocking properties.

As is well-known in the art, the ratio of MLMFI to MFI can be used to represent the molecular weight distribution and, therefore, to represent the degree of the visbreaking.

For example, when propylene-ethylene copolymer samples each having an MFI of 0.09 g/10 min were visbroken by using various amounts of 1,3-bis(t-butyl peroxyisopropyl) benzene, the following correlations between the MFI and MLMFI/MFI were obtained.

| MFI | MLMFI/MFI |
|---|---|
| 0.09 | 20.1 |
|  | (before visbreaking) |
| 0.13 | 18.6 |
| 0.56 | 15.8 |
| 1.8 | 13.1 |
| 3.4 | 12.8 |
| 8.2 | 12.6 |
| 12.3 | 12.3 |
| 28.6 | 11.6 |

As mentioned above, the desired range of MLMFI/MFI of the copolymers of the present invention is within the range of from 10 to 16, more desirably 12 to 16, in the case of a MFI of the visbroken copolymer of about 1 g/10 min, 10 to 14 in the case of an MFI of the visbroken copolymer of about 10 g/10 min, and 10 to 12 in the case of MFI of the visbroken copolymer of about 50 g/10 min.

The propylene copolymer composition comprises 20% to 90% by weight of the above-mentioned propylene-ethylene random copolymer (i.e. component A) and 10% to 80% by weight of a propylene homopolymer or a propylene-ethylene random copolymer having an ethylene content of 3% by weight or less or LLDPE (i.e. component B).

According to the present invention, the following practical advantages and features are provided:
1. A propylene-ethylene random copolymer having a low melting point of 115° C. to 140° C. can be produced by slurry polymerization without any problems during the polymerization, purification, drying, and transportation steps.
2. A high ethylene content propylene-ethylene random copolymer having any desirable moldability (i.e., MFI) can be readily produced.
3. A high ethylene content propylene-ethylene random copolymer can be economically produced with a less amount of atactic polypropylene.
4. A propylene-ethylene random copolymer having a low melting point, which has not been commercially produced, become possible to be produced. Therefore, this copolymer is suitable for use in the formation of a water-cooling tubular film, a T-die cast film, and a composite film. Thus, various films having an excellent impact resistance at a low temperature and heat sealability and an excellent transparency can be produced.
5. A propylene-ethylene random copolymer having excellent characteristics including a low-melting point, a high transparency, an excellent impact resistance, especially at a low temperature, an excellent thermal resistance, and a high flexibility can be provided. Therefore, the present copolymer can also be used in injection molding, extrusion molding, and blow molding to produce various appliances, automobile parts, toys, and daily necessities.

The water-cooling tubular film of the present invention now will be explained in detail.

The polypropylene has been required to have many characteristics such as film having an excellent strength, especially impact strengths at a low temperature, an excellent transparency and anti-blocking properties in the art.

Known polypropylene water-cooling tubular films have a disadvantage that the impact strength remarkably decreases when the film is used as a wrapping material at a low temperature, especially 0° C. or less. It has been proposed to eliminate this disadvantage that ethylene and/or α-olefins are blockwise copolymerized with propylene. However, this causes to lose the transparency of the water-cooling tubular film.

An ethylene content of less than 6 mol % results in an undesirable decrease in the low-temperature properties and in heat sealability at a low temperature. Contrary to this, an ethylene content of more than 17 mol % results in a decrease in the anti-blocking property. When a large amount of an anti-blocking agent is used to improve the anti-blocking property, film having a desired transparency cannot be obtained.

A block index of more than 1.1 causes an undesirable decrease in transparency, when a film is molded from the copolymer.

An MFI of less than 1 g/10 min or more than 30 g/10 min results in an undesirable tubular film moldability. Contrary to this, an MFI of more than 30 g/10 min results in difficulty in pelletizing the copolymer.

A copolymer having a ratio of MLMFI/MFI of more than 16 cannot sufficiently show the desired excellent properties such as the excellent transparency, a better low-temperature impact strength, and anti-blocking properties. Contrary to this, in order to produce a copolymer having a ratio of MLMFI/MFI of less than 10, a large amount of the peroxide is required, therefore, that causes undesirable problems such as color and odor.

The present water-cooling tubular film can be produced from the above-mentioned visbroken propylene-ethylene random copolymer having the specified characteristics by any conventional methods. For instance, a tubular film having a thickness of 30 μm and a folded width of 190 mm can be produced at a cooling water temperature of 25° C. by using a conventional water-cooling tubular film machine which has a 40 mmφ conventional extruder with a die diameter of 100 mm and a lip gap of 0.8 mm. Accordingly, the present water-cooling film derived from a propylene-ethylene random copolymer having the above-mentioned characteristics and can be used for the packaging materials especially for food packaging fields.

The T-die cast film of the present invention now will be further explained.

Known polypropylene T-die cast films have a disadvantage in that the impact strength remarkably decreases when the film is used as a wrapping material at a low temperature, especially at 0° C. or less. The proposed method of block copolymerizing ethylene with propylene results in undesirable decrease in the transparency of the T-die cast film. Furthermore, the heat-sealability of the film at a low temperature is remarkably inferior to those of high-pressure polyethylene and linear low-density polyethylene. Thus, a polypropylene film having an excellent impact strength at a low temperature, an excellent transparency and an excellent heatsealability at a low temperature is desired in the art. Such excellent film can be provided by the present invention.

An ethylene content of less than 6 mol % results in an undesirable decrease in the low-temperature properties and in heat sealability at a low temperature. Contrary to this, an ethylene content of more than 15 mol % results in a decrease in the anti-blocking property. When a large amount of an anti-blocking agent is used to improve the anti-blocking property, film having a desired transparency cannot be obtained.

A block index of more than 1.1 causes an undesirable decrease in transparency, when a film is molded from the copolymer.

An MFI of less than 0.5 g/10 min or more than 50 g/10 min results in an undesirable T-die film moldability. Contrary to this, an MFI of more than 30 g/10 min results in difficulty in pelletizing the copolymer.

A copolymer having a ratio of MLMFI/MFI of more than 16 cannot sufficiently show the desired excellent properties such as the excellent transparency, a better low-temperature impact strength, and anti-blocking properties. Contrary to this, in order to produce a copolymer having a ratio of MLMFI/MFI of less than 10, a large amount of the peroxide is required, therefore, that causes undesirable problems such as color and odor.

The present T-die cast film can be produced also from the above-mentioned visbroken propylene-ethylene random copolymer having the specified characteristics by any conventional methods. For instance, a T-die cast film having a thickness of 60 μm could be produced by melt extruding the copolymer at a temperature of 250° C. from a conventional 40 mmφ extruder through a T-die having a slit gap of 0.7 mm to cooling rolls having a temperature of 25° C. Accordingly, the present T-die cast film can be suitably used for the packaging materials, especially for food packaging, at a low temperature.

The composite film of the present invention now will be further explained.

A copolymer having a melting point of higher than 135° C. cannot show excellent heat sealability at a low temperature.

An ethylene content of less than 10 mol % results in an undesirable decrease in heat sealability at a low temperature. Contrary to this, an ethylene content of more than 17 mol % results in a decrease in the anti-blocking property. When a large amount of an anti-blocking agent is used to improve the anti-blocking property, film having a desired transparency cannot be obtained.

A block index of more than 1.1 causes an undesirable decrease in transparency, when a film is molded from the copolymer.

An MFI of less than 1 g/10 min or more than 60 g/10 min results in an undesirable moldability. Contrary to this, an MFI of more than 30 g/10 min results in difficulty in pelletizing the copolymer.

A copolymer having a ratio of MLMFI/MFI of more than 16 cannot sufficiently show the desired excellent properties such as the excellent transparency, a better low-temperature heat sealability, and anti-blocking properties. Contrary to this, in order to produce a copolymer having a ratio of MLMFI/MFI of less than 10, a large amount of the peroxide is required, therefore, that causes undesirable problems such as color and odor.

The present composite film comprises a first substrate layer of crystalline polypropylene and at least one second heatsealing layer laminated on at least one surface of the first layer. The second layer is composed of the above-mentioned present visbroken propylene-ethylene random copolymer having the specified characteristics.

The first layer on which the above-mentioned degraded propylene-ethylene random copolymer is laminated is composed of crystalline polypropylenes having a density of 0.89 to 0.92, an MFI of 0.1 to 50 g/10 min, and an insoluble portion in boiling n-heptane of 85 to 99.5% by weight. These crystalline polypropylenes can be propylene homopolymers and propylene copolymers containing a small amount (e.g. 2% by weight or less) of copolymerized ethylenically unsaturated monoolefin. The crystalline polypropylenes can optionally contain conventional additives such as an anti-oxidant, an ultraviolet absorber, an anti-blocking agent, a slip agent, and an anti-static agent. Furthermore, a small amount (e.g., 1 to 10% by weight) of a different polymer or polymers (e.g., low-density and high-density polyethylenes, EP rubber, polybutene, petroleum resin) can be blended with the crystalline polypropylenes so long as the transparency of the film is not impaired.

The composite film can be produced by any conventional methods. For instance, the above-mentioned propylene-ethylene random copolymer in a molten state is laminated or fused on one or both surfaces of the crystalline polypropylene film. The resultant film can be non-stretched, monoaxially stretched or biaxially oriented film. Otherwise, the substrate crystalline polypropylene and the visbroken propylene-ethylene random copolymer can be co-extruded in any conventional manner to form a desired composite film.

The thickness of the substrate crystalline polypropylene layer of the film is usually 5 to 200 μm, desirably 5 to 70 μm and the thickness of the heatsealable random copolymer layer is usually 0.1 to 100 μm, desirably 0.3 to 30 μm.

Known crystalline polypropylene films, especially biaxially oriented films, are widely used as, for example, a food packaging material because they have excellent optical properties such as transparency and luster and mechanical properties such as stiffness modulus and tensile strength as well as non-odorous and non-toxic properties. However, polypropylene films have disadvantages in that heatsealability and heatsealing strength are not sufficient to practically use in the packaging materials. Various attempts to eliminate these disadvantages have been made. However, polypropylene composite films having the desired heatsealability, antiblocking properties, transparency and high speed moldability have not been developed. According to the present invention, these desired composite films can be provided by combining a crystalline polypropylene substrate layer and the visbroken propylene-ethylene random copolymer heatsealable layer.

Thus, since the present polypropylene composite film has, as compared with the conventional films, an excellent high speed moldability, an uniformly laminated state, a high heat sealability and heatsealing strength and a high transparency, the present film can be suitable for a packaging material such as food packaging, garment packaging and fiber packaging.

EXAMPLES

The present invention now will be further illustrated by, but it is by no means limited to, the following Examples. In these Examples all parts and percentages are expressed on a weight basis unless otherwise specified and, the physical properties of the polymers and films were determined as follows:

(1) Melting point Tm: see above.
(2) Ethylene content (mol %): see above.
(3) Block index: see above.
(4) MFI: see above.
(5) MLMFI: see above.
(6) Soluble portion in hexane of polymer: A polymer sample is dried overnight in a vacuum dryer and 5 g of the dried sample is extracted with hexane at a boiling point of n-hexane for 6 hours by using a Soxhlet extractor. The amount of the sample solved in hexane is determined.
(7) Soluble portion in isobutanol (IBA) of polymer: The dried sample of the above (6) is extracted with IBA at a boiling point of IBA for 6 hours by using a Soxhlet extractor.
(8) Liquid content after centrifugal separation: The difference in weight before and after drying of the polymer which is centrifugal separated from IBA is determined. From this value, IBA content (%) is calculated.
(9) Particle size of polymer: The polymer is sieved according to a JIS-Z-8801 method. $\bar{D}_{10}$, $\bar{D}_{50}$ and $\bar{D}_{90}$ means the particle diameters of the polymer particles corresponding to 10, 50 and 90% of integrated weight fractions.
(10) Impact strength of film: Determined by using a pendulum type impact tester (manufactured by Toyo Seiki Co., Ltd.) having a ½ inch ball at a constant temperature.
(11) Haze of film: Determined according to an ASTM-D-1003 method
(12) Tensile test: Determined according to an ASTM-D-638 method.
(13) Flexural modulus: Determined by using an injection molded flat plate having a thickness of 2 mm according to an ASTM-D-790 method.
(14) Brilleness temperature: Determined according to an ASTM-D-746 method.
(15) Heatsealability (sealing temperature): The film is heat sealed under a pressure of 1 kg/cm$^2$ and a heatseal time of 1 second at various temperatures by using a heatseal bar having a width of 5 mm. A test specimen having a width of 15 mm is cut from the heat sealed sample and is provided to a peeling strength test and at a draw rate of 50 mm/min by using an Instron tester. The value of peeling strength obtained in each test is plotted as a function of in a temperature and the temperatures at which the strengths are 500 g and 300 g are determined.
(16) Heatseal strength: Film is heat sealed under a pressure of 1 kg/cm$^2$ and a heatseal time of 1 second at 110° C. by using a heatseal bar having a width of 5 mm. A test specimen having a width of 15 mm is cut from the heat sealed test sample and the peeling strength is determined at a room temperature and at a draw rate of 300 mm/min by using an Instron tester.

EXAMPLE 1

Thirty-nine g/hr of a titanium trichloride composition (powder obtained by co-grinding 5.0 kg of commercially available AA grade titanium trichloride and 0.75 kg of γ-butyrolactone for 30 hours in an vibrating mill having a amplitude of 8 mm in diameter), 0.30 liters/hr of a solution of $(C_2H_5)_2$ AlCl in heptane (2 mol/liter), 91 kg/hr of propylene, 4 kg/hr of ethylene, and 4.1 Nl/hr of $H_2$ were fed into a 290 liter pipe-loop continuous reactor to effect continuous polymerization at a temperature of 60° C. A total of 52 kg/hr of propylene and 43 kg/hr of a propylene-ethylene copolymer were discharged from the reactor.

Even after 24 hours of continuous polymerization, no decrease in the thermal conductivity coefficient U of the reactor and no appreciable fractuation in the power of the agitating pump were observed.

About 200 kg of the crude polymer obtained above and then 2 $m^3$ of isobutanol were introduced into a vessel and were agitated at a temperature of 95° C. for about 30 minutes. The slurry thus obtained was centrifuged in a horizontal-type centrifugal separator (i.e., Super Decanter-P-660 manufactured by Tomoe Kogyo Co. Japan) and then the obtained powder was dried in a dryer while circulating a $N_2$ gas at a temperature of 100° C. Thus, the purified and dried propylene-ethylene copolymer was obtained in the form of white powder.

No trouble in the reactor system was observed during 24 hours of continuous polymerization. Furthermore, neither clogging, agglomeration, nor conglomeration of the copolymers in the purification, centrifugation, and drying steps were observed at all.

The properties of the crude copolymer were as follows:
MFI: 0.08 g/10 min.
n-hexane soluble portion: 10.3%.
IBA soluble portion: 14%.
Propylene content: 91.5%
Mw of IBA soluble portion: 7800.
Particle diameter:
$\overline{D}_{90} = 950$ μm
$\overline{D}_{50} = 540$ μm
$\overline{D}_{10} = 180$ μm.
IBA content of the powder after centrifugal separation: 32%.
Particle diameter of the powder after purification and drying:
$\overline{D}_{90} = 910$ μm
$\overline{D}_{50} = 440$ μm
$\overline{D}_{10} = 150$ μm.
(The particle size became somewhat small rather than agglomerating.)
Angle of repose: 35°.
Bulk density $\rho_B$: 0.3 g/cc.

To the dried purified powder obtained above, 0.08% of 2,6-di-tert-butyl-4-methylphenol, 0.1% of stearyl-β-(3,5-di-tert-butyl-4-hydroxyphenyl) propionate, 0.15% of calcium stearate, 0.1% of dimyristyl thiodipropionate, 0.1% of cyclic neopentane tetrayl-bis (octadecyl phosphite), and, as a peroxide, 0.06% of 1,3-bis-(tert-butyl peroxyisopropyl) benzene were added. Then the mixture was pelletized with a 40 mmφ extruder under the conditions of $C_1 = 190°$ C., $C_2 = 230°$ C., and $D = 240°$ C. The properties of the resultant pellets were as follows:
Melting point $T_m = 127.2°$ C.
Ethylene content = 12.0 mol %
Block index = 0.98.
MFI = 8.2 g/10 min.
MLMFI/MFI = 12.3.

COMPARATIVE EXAMPLE 1

The copolymerization was repeated in the same manner as in Example 1, except that the amount of $H_2$ fed into the reactor was changed to 51 Nl/hr.

Six hours after the start of polymerization, a decrease in the thermal conductivity coefficient U of the reactor and an increase in the fractuation of the power of the agitating pump were began, and after 12 hours of the continuous polymerization was the decrease in U became more than 20%. This is because a substantial amount of polymer was deposited on an inner wall of the reactor. Furthermore, the formation of polymer mass having a size of one's was observed in the lower part of the flush hopper.

The properties of the resultant crude copolymer were as follows:
MFI: 8.1 g/10 min
n-hexane soluble portion: 25.4%.
IBA soluble portion: 5.0%.
Propylene content: 91.8%.
Mw of IBA soluble portion: 7400.
Particle diameter:
$\overline{DHD}\ 90 = 1420$ μm
$\overline{DHD}\ 50 = 760$ μm
$\overline{DHD}\ 10 = 200$ μm.
Percentage of powder having a particle diameter of 5000 μm or more: 26%.

The crude copolymer thus obtained was washed with IBA and, then, subjected to a centrifugal separation as in Example 1. The IBA slurry was very viscous and IBA liquid content of the resultant caky powder after the centrifugal separation was as high as 58%. For this reason, non-fluidizable polymer mass was formed at the bottom of the dryer and the amount of the non-fluidizable polymer mass which could not continuously removed from the dryer was as high as 10% or more of the total polymer. Thus, stable continuous operation could not achieve satisfactory.

Particle size distribution of the polymer after drying was as follows:
$\overline{DHD}\ 90 = 3040$ μm
$\overline{DHD}\ 50 = 1020$ μm
$\overline{DHD}\ 10 = 210$ μm.
The percentage of the polymer particles having a diameter of 5000 μm or more was 4.2% and the angle of repose was 52° and the bulk density $\rho_0$ was 0.28 g/cc.

The polymer powder thus obtained was pelletized in the same manner as in Example 1, except that no peroxide was added. The properties of the resultant pellets were as follows:
Melting point $T_m = 126.7°$ C.
Ethylene content = 11.7 mol %.
Block index = 1.21.
MFI = 8.3 g/10 min.
MLMFI/MFI = 21.4.

EXAMPLES 2 to 6

Various pellets were obtained by using the purified and dried powder obtained in Example 1 in the presence of peroxide whose kinds and amounts set forth in Table 1. The physical properties of the pellets thus obtained were determined and shown in Table 1.

Experiments were repeated using the powder obtained in Example 1 in the presence of various kinds and amounts of peroxides. The physical properties are shown in Table 1.

TABLE 1

|  | Example 1 | Example 2 | Example 3 | Example 4 | Example 5 | Example 6 | Comparative Example 1 | Comparative Example 2 | Comparative Example 3 |
| --- | --- | --- | --- | --- | --- | --- | --- | --- | --- |
| Kind of peroxide[*1] | A | A | A | A | B | C | — | — | — |
| Amount of peroxide | 0.06 | 0.014 | 0.026 | 0.11 | 0.16 | 0.04 | — | — | — |
| MFI | 8.2 | 0.9 | 2.3 | 18.2 | 28.4 | 10.3 | 8.3 | 0.12 | 0.96 |
| MLMFI/MFI | 12.3 | 15.2 | 13.8 | 11.8 | 11.4 | 12.4 | 21.4 | 20.4 | 21.1 |
| Tm (°C.) | 127.2 | 126.6 | 127.0 | 127.8 | 128.6 | 128.1 | 126.7 | 126.0 | 126.3 |
| Block index | 0.98 | 1.02 | 1.00 | 0.93 | 0.93 | 0.95 | 1.21 | 0.94 | 1.07 |
| Ethylene content (mol %) | 12.0 | 12.0 | 12.0 | 12.0 | 12.0 | 12.0 | 11.7 | 12.0 | 12.0 |
| Stiffness ($\times 10^3$ kg/cm$^2$) | 4.3 | 4.1 | 4.2 | 4.6 | 4.7 | 4.3 | 4.9 | 4.1 | 4.8 |
| Brittle temperature | −18.4 | −19.3 | −18.8 | −17.2 | −16.9 | −18.2 | −4.2 | −19.6 | −6.6 |
| Tensile Test | | | | | | | | | |
| Y | 172 | 170 | 170 | 178 | 180 | 178 | 182 | 170 | 186 |
| B | 360 | 375 | 350 | 360 | 360 | 370 | 320 | 380 | 370 |
| E | 800 | 780 | 820 | 800 | 820 | 800 | 770 | 680 | 820 |
| Pellet color[*2] | 2 | 2 | 2 | 1 | 1 | 2 | 1 | 5 | 2 |

[*1] A 1,3-bis(tert-butyl peroxyisopropyl)benzene
B 2,5-dimethyl-2,5-di(tert-butylperoxy)hexane
C dicumyl peroxide
[*2] Visual observation 1 Excellent, 2 Good, 3 Fair, 4 Poor, 5 Bad

COMPARATIVE EXAMPLE 2

The purified and dried powder obtained in Example 1 was pelletized in the same manner as in Example 1, except that no peroxide was used. The melt flow was unsatisfactory to use for the molding. Furthermore, the pellets were extremely undesirably colored.

COMPARATIVE EXAMPLE 3

The copolymerization was repeated in the same manner as in Example 1, except that the amount of H$_2$ fed to the reactor was changed to 12 Nl/hr.

As in Comparative Example 1, the decrease in U of the reactor began after about 10 hours of the continuous polymerization. After 18 hours of the continuous polymerization the decreasing ratio of U was about 20% and the fractuation in the powder of the agitating pump became large that indicated the deposition of polymer on the inner wall of the reactor.

The crude copolymer thus obtained had an MFI of 0.86 g/10 min, a propylene content of 91.7% and the soluble portion in hexane was 23.8%.

The powder of the crude copolymer was purified and dried in the same manner as in Example 1. The IBA content in the powder after the centrifugal operation was 48% and non-fluidizable block mass was formed in the drier. As a result, the operation could not but be stopped.

EXAMPLE 7

The copolymerization was repeated in the same manner as in Example 1, except that 4.3 kg/hr of butene-1 was added in addition to 4 kg/hr of ethylene and 2.0 Nl/hr of H$_2$ was fed.

The crude copolymer thus obtained had an MFI of 0.05 g/10 min, an ethylene content of 8.3%, a butene-1 content of 2.9%, a soluble portion in hexane of 10.5% and a soluble portion in IBA of 1.7%. 24 hour's continuous operation could be carried out, without causing any troubles in the polymerization and purification steps, as in Example 1.

The pelletizing was repeated in the same manner as in Example 1. Thus, copolymer pellets having an MFI of 12.4 g/10 min, a Tm of 122.4° C., and an MLMFI/MFI of 11.9 were obtained.

EXAMPLE 8

Fifteen g/hr of a solid catalyst component (obtained by depositing an equi-molar mixture of titanium tetrachloride and hexamethyl disiloxane, in hexane at 70° C., on a support prepared by co-grinding 0.9 kg of benzoyl chloride and 3.0 kg of magnesium chloride with a 100 liter vibrating mill), 0.7 liter/hr of an equi-volume mixture of a solution of (C$_2$H$_5$)$_3$Al in n-heptane (1 mol/l) and a solution of ethyl benzoate in n-heptane (0.3 mol/l), 94 kg/hr of propylene, 5.7 kg/hr of ethylene and 0.2 Nl/hr of H$_2$ were fed into a 290 liter pipe-loop continuous reactor to effect continuous polymerization at a temperature of 60° C. 40 kg/hr of propylene-ethylene random copolymer was discharged from the reactor.

The copolymer was dried in a paddle dryer. The resultant copolymer had a propylene content of 89.0%, a Tm of 121.4° C., an MFI of 0.04 g/10 min, a soluble matter in n-hexane of 14.2% and a soluble portion in IBA of 2.0%. 24 hour's continuous operation could be carried out without causing any undesirable troubles.

The pelletizing was repeated in the same manner as in Example 1. These pellets have an MFI of 8.3, MLMFI/MFI of 12.9, Tm of 122.3° C. and a block index of 0.99.

EXAMPLE 9

A tubular film having a thickness of 20 μm was obtained by using the pellets obtained as follows. The pellets of Example 1 having an MFI of 8.2 g/10 min, a Tm of 127.2° C. and an MLMFI/MFI of 12.3 was blended with silica as an anti-blocking agent and erucamide as a lubricant. A film was obtained by using a 40 mmφ extruder (a die diameter of 100 mm) under the conditions of a die temperature of 220° C., a cooling water temperature of 25° C. and a screw revolution speed of 80 rpm. The blow-up ratio was 1.2.

The resultant film had impact strengths of 90 and 500 kg·cm/mm at −5° C. and 20° C., respectively, and a haze of 3.9%.

COMPARATIVE EXAMPLE 4

The tubular film having a thickness of 20 μm was produced in the same manner as in Example 9, except that propylene-ethylene copolymer directly produced without visbreaking was used. The copolymer had an MFI of 8.5, a Tm of 140.4° C., a propylene content of 95.1% and an MLMFI/MFI of 21.

The resultant film had impact strengths of 10 and 390 kg·cm/mm at a temperature of −5° C. and 20° C., respectively, and a haze of 5.0%.

EXAMPLE 10

Crude propylene-ethylene copolymer powder having an MFI of 0.15 g/10 min, a propylene content of 91.9%, a soluble portion in n-hexane of 12.1% and a soluble portion in IBA of 1.6% was obtained in the same manner as in Example 1, except that 6 Nl/hr of $H_2$ was fed. 24 hour's continuous polymerization could be carried out, as in Example 1, without causing any troubles in the polymerization, purification and drying steps.

The resultant copolymer powder was pelletized in the same manner as in Example 1, except that the amount of the peroxide was 0.03%. The resultant pellets had an MFI of 9.7 g/10 min, a Tm of 128.1° C. and an MLMFI/MFI of 13.6.

EXAMPLE 11

To 100 parts of the purified and dried random copolymer obtained in Example 1, 2,5-dimethyl-2,5-di(tert-butylperoxy)hexane (peroxide, Perhexa 2,5B-40 manufactured by Nippon Fat and Oil Co.) in an amount listed in Table 3 below, 0.25 parts of tetrakis [methylene-3-(3',5'-di-tert-butyl-4'-hydroxyphenyl)propionate] methane and 0.1 part of calcium stearate were added. Then, the mixture was blended in a Henschel mixer and pelletized with an extruder at a temperature of 240° C. The pellet had an MFI of 5.1 g/10 min, an MLMFI/MFI of 12.7, a block index based on $C^{13}$-NMR of 0.92 and a Tm of 126.8° C.

To the pellet, 0.55% of synthetic silica (i.e., an antiblocking agent, and 0.30% of oleamide (i.e., a lubricant) were added and, from them, a tubular film having a thickness of 30 μm and a folded tube width of 190 mm was obtained under the conditions of a cooling water temperature of 25° C. and a die temperature of 220° C. by using a water-cooling tubular film machine which has a conventional 40 mmφ extruder, a die diameter of 100 mm and a lip gap of 0.8 mm.

The physical properties of the resultant film were determined according to the above-mentioned methods. The results are shown in Table 2 below.

EXAMPLES 12 to 14 and COMPARATIVE EXAMPLES 5 to 8

Powders of various copolymers having different ethylene contents were produced in the same manner as in Example 1, except that the amounts of fed ethylene were changed. The resultant copolymers were visbroken by adding peroxide anti-blocking agent and the lubricant and water cooling tubular film having a thickness of 30 μm were produced in the same manner as in Example 1. The results are shown in Table 2.

Comparative Examples 7 and 8 are experiments as to a copolymer which was produced under different amount of $H_2$ (the trouble similar to those as described in Comparative Example 1 was observed in Comparative Example 7) without being subjected to the visbreaking and which had a block index and an MLMFI/MFI of larger than the upper limits of the desired ranges of the present invention. Comparative Example 9 is an experiment as to a copolymer which was produced by minorly visbreaking the above-mentioned copolymer and which had an MLMFI/MFI of larger than the upper limit of the desired range of the present invention.

EXAMPLE 15

Propylene-ethylene-butene copolymer was produced in the same manner as in Example 1, except that 4 kg/hr of butene-1 was fed together with 4 kg/hr of ethylene. The resultant copolymer had a butene-1 content of 1.6 mol % and a Tm of 126° C.

The copolymer thus obtained was visbroken and, then, water cooling tubular film was molded in the same manner as in Example 11. The results are shown in Table 2.

EXAMPLE 16

Propylene-ethlene-butene copolymer was produced in the same manner as in Example 1, except that 3 kg/hr of ethylene and 3 kg/hr of butene-1 were fed instead of 4 kg/hr of ethylene. Thus, the copolymer powder having an MFI of 0.08 g/10 min, an ethylene content of 9.6 mol % and a butene-1 content of 1.3 mol % was produced.

The copolymer powder was visbroken and, then, water cooling tubular film was molded therefrom, in the same manner as in Example 11.

The results are shown in Table 2.

COMPARATIVE EXAMPLE 10

Water cooling tubular film was molded in the same manner as in Example 11 by using a commercially-available propylene-ethylene block copolymer, SHOALLOMER MK 311C (manufactured by Showa Denko Co., Ltd) having an ethylene content of 7.4 mol %, an MFI of 5.1 g/10 min, a block index of 3.7 and an MLMFI/MFI of 19.6.

The results are shown in Table 2.

As is clear from the results shown in Table 2, an extremely high impact strength at a low temperature can be obtained by the present invention (see Example 13), as compared with Comparative Example 6 having a low ethylene content. Furthermore, the copolymer of Example 13 having a desired block index and MLMFI/MFI has a significantly improved impact strength at a low temperature as compared with Comparative Example 7, even when they have the same ethylene content.

TABLE 2

| | | Ethylene content mol % | Polymer powder MFI | Peroxide part | Block index | After visbreaking MLMFI/MFI | After visbreaking MFI | Amide % | Silica % | Tm °C. | Impact strength −5° C., kg·cm/mm | Haze* % |
|---|---|---|---|---|---|---|---|---|---|---|---|---|
| Example | 11 | 12.0 | 0.08 | 0.32 | 0.92 | 12.7 | 5.1 | 0.30 | 0.55 | 126.8 | 135 | 4.0 |
| | 12 | 10.3 | 0.08 | 0.34 | 0.90 | 12.4 | 5.7 | 0.30 | 0.50 | 129.2 | 93 | 3.9 |
| | 13 | 8.4 | 0.07 | 0.36 | 0.94 | 12.7 | 6.2 | 0.26 | 0.50 | 134.6 | 69 | 3.9 |
| | 14 | 7.1 | 0.07 | 0.29 | 0.95 | 11.9 | 4.8 | 0.26 | 0.50 | 139.1 | 56 | 3.9 |
| | 15 | 11.5 | 0.10 | 0.32 | 0.91 | 12.7 | 5.3 | 0.32 | 0.55 | 126.4 | 140 | 4.3 |
| | 16 | 9.6 | 0.08 | 0.32 | 1.01 | 12.2 | 5.7 | 0.32 | 0.55 | 130.3 | 88 | 4.1 |
| Comparative | 5 | 5.7 | 0.07 | 0.33 | 0.93 | 12.0 | 5.5 | 0.24 | 0.50 | 143.1 | 21 | 3.9 |

TABLE 2-continued

|   | | Ethylene content mol % | Polymer powder MFI | Peroxide part | Block index | After visbreaking MLMFI/MFI | MFI | Amide % | Silica % | Tm °C. | Impact strength −5° C., kg · cm/mm | Haze* % |
|---|---|---|---|---|---|---|---|---|---|---|---|---|
| Example | 6 | 4.2 | 0.07 | 0.31 | 0.90 | 11.8 | 5.2 | 0.24 | 0.50 | 145.2 | 8 | 3.9 |
| | 7 | 8.6 | 5.6 | 0 | 1.26 | 20.0 | 5.8 | 0.30 | 0.40 | 134.4 | 27 | 5.0 |
| | 8 | 5.2 | 5.0 | 0 | 1.22 | 20.4 | 5.2 | 0.24 | 0.35 | 144.0 | 11 | 3.9 |
| | 9 | 7.8 | 1.3 | 0.17 | 0.98 | 16.5 | 6.2 | 0.26 | 0.40 | 136.5 | 32 | 4.0 |
| | 10 | 5.4 | 5.1 | 0 | 3.7 | 19.6 | 5.1 | 0.24 | 0.35 | 152.7 | 140 | 16.0 |

*Minimum amounts of silica and amide were added to effect easy openability property of the film.

EXAMPLE 17

To 100 parts of the purified and dried random copolymer obtained in Example 1, 2,5-dimethyl-2,5-di(tert-butylperoxy)hexane, as a peroxide, in an amount listed in Table 3 below, 0.15 parts of tetrakis [methylene-3-(3',5'-di-tert-butyl-4'-hydroxyphenyl)propionate] methane, 0.1 part of calcium stearate, oleamide in an amount listed in Table 3 below and finely divided silica in an amount listed in Table 3 were added. Then, the mixture was blended in a Henschel mixer and pelletized through an extruder at a temperature of 240° C. The pellet (A) thus obtained had an MFI of 11.0 g/10 min, an MLMFI/MFI of 12.1, a block index based on $C^{13}$-NMR of 0.92 and a Tm of 127.1° C.

A stretched polypropylene sheet was produced as follows.

Polypropylene sheet conventionally made from homopoly-propylene having an MFI of 2.3 g/10 min and an extraction in boiling heptane of 97.6% was stretched at a substantial stretch ratio of 5 times under 140° C. at a short interval between two pairs of nip rolls having different peripheral speeds. Then, the copolymer pellet (A) (at a resin temperature of 250° C.) was extruded on the stretched isotactic poly propylene sheet obtained above. The two layer sheet was laterally oriented at a draw ratio of 8 times at temperature of 160° C. and, then, thermally stretching treated at 120° C. for 3 seconds. Thus, a biaxially oriented two-layer film composed of a substrate layer having a thickness of 30 μm and a heat seal layer having a thickness of 2 μm was obtained.

The heat seal temperature, heat seal strength, and haze of the film were determined. The results are shown in Table 3.

COMPARATIVE EXAMPLE 11

Example 1 was repeated except that an amount of fed ethylene was changed. Thus, purified white powder having an ethylene content of 8.0 mol %, and an MFI of 0.08 g/10 min was obtained. The copolymer was extruded, after mixed with the peroxide, in the same manner as in Example 17, to form a pellet having an MFI of 10.9 g/10 min, an MLMFI/MFI of 12.3 and a block index of 0.94. The copolymer was extruded on the polypropylene sheet and was biaxially oriented in the same manner as in Example 17. Thus, a biaxially oriented composite film was obtained.

The results are shown in Table 3 below.

COMPARATIVE EXAMPLE 12

Propylene-ethylene copolymer was prepared and purified in the same manner as described in Example 1, except that 82 g/hr of the titanium trichloride composition, 3.5 kg/hr of ethylene and 132 Nl/hr of $H_2$ were fed and that a polymerization temperature of 40° C. Thus, white copolymer powder having an MFI of 10.3 g/10 min and an ethylene content of 10.7 mol % was obtained. The powder were partially agglomerated.

The copolymer was pelletized in the same manner as in Example 17, except that the peroxide was not added. Thus, a pellet having an MFI of 10.3 g/10 min, an MLMFI/MFI of 19.6 and a block index of 1.21 was obtained.

From the pellet thus obtained, a composite film was produced in the same manner as in Example 17. The physical properties of the resultant film are shown in Table 3 below.

COMPARATIVE EXAMPLE 13

Commercially available propylene-ethylene block copolymer, SHOALLOMER SK 711 (manufactured by Showa Denko Co., Ltd.) having an ethylene content of 12.2 mol % and a MFI of 0.83 g/10 min was extruded in the same manner as in Example 17 after mixed with 0.12% of the peroxide used in Example 17. The pellet thus obtained had an MFI of 12.4 g/10 min, an MLMFI/MFI of 14.6 and a block index of 4.1.

Composite film was produced from the pellet obtained above in the same manner as in Example 17. The properties of the resultant film are shown in Table 3 below.

COMPARATIVE EXAMPLE 14

Propylene homopolymer having an MFI of 13.0 g/10 min was obtained in the same manner as in Example 1, except that no ethylene was fed and 130 Nl/hr of $H_2$ was fed.

Composite film was produced from the homopolymer in the same manner as in Example 17. The properties of the composite film are shown in Table 3.

COMPARATIVE EXAMPLE 15

Copolymer having an MFI of 24 g/10 min, an ethylene content of 6.5 mol % and a block index of 0.90 was produced in the same manner as in Example 1, except that 2 kg/hr of ethylene and 2.9 Nl/hr of $H_2$ were fed.

Composite film was produced from the copolymer obtained above in the same manner as in Example 17. The properties of the resultant composite film are shown in Table 3 below.

EXAMPLE 18

Copolymer having an MFI of 0.15, an ethylene content of 10.8 mol % and a block index of 0.90 was produced in the same manner as in Example 1, except that 3.5 kg/hr of ethylene, and 5.7 Nl/hr of $H_2$ were fed.

Composite film was produced from the copolymer thus obtained in the same manner as in Example 17.

The results are shown in Table 3 below.

EXAMPLE 19

Copolymer having an MFI of 0.04, an ethylene content of 14.2 mol % and a block index of 0.96 was prepared in the same manner as in Example 1, except that 4.8 kg/hr of ethylene and 2.5 Nl/hr of $H_2$ were fed.

Composite film was molded from the copolymer thus obtained in the same manner as in Example 17.

The results are shown in Table 3 below.

EXAMPLE 20

Copolymer having an MFI of 0.10, an ethylene content of 11.5 mol %, a block index of 0.91, a butene-1 content of 2.8 mol % and a Tm of 124° C. was prepared in the same manner as in Example 1, except that 6 kg/hr of butene-1 was also added, as a comonomer, in addition to ethylene.

Composite film was produced from the copolymer obtained above in the same manner as in Example 17.

The results are shown in Table 3.

EXAMPLES 22 to 24 and COMPARATIVE EXAMPLES 16 to 19

Various copolymer powders having different ethylene contents were produced in the same manner as in Example 1, except that the amounts of the fed ethylene were changed. The resultant copolymers were visbroken by a peroxide in the presence of the anti-blocking agent and the lubricant and, then, T-die films having a thickness of 60 μm were produced in the same manner as in Example 26.

The results are shown in Table 4.

Comparative Example 18 is an experiment as to a copolymer which was produced under a different amount of $H_2$ (a problem to those as described in Comparative Example 1 was observed) without being sub-

TABLE 3

| | | Ethylene content mol % | Block index | Peroxide phr | After Visbreaking MFI | MLMFI MFI | Silica/Amide* phr phr | Tm °C. | Sealing temp. °C., 500 g | Sealing temp. °C., 300 g | Haze % |
|---|---|---|---|---|---|---|---|---|---|---|---|
| Example | 17 | 12.0 | 0.92 | 0.35 | 11.0 | 12.1 | 0.36/0.15 | 127.1 | 124 | 117 | 2.5 |
| Comparative | 11 | 8.0 | 0.94 | 0.35 | 10.9 | 12.3 | 0.29/0.15 | 136.0 | 132 | 128 | 2.6 |
| Example | 12 | 10.7 | 1.21 | 0 | 10.3 | 19.6 | 0.38/0.15 | 131.8 | 132 | 126 | 3.4 |
| | 13 | 12.2 | 4.1 | 0.12 | 12.4 | 14.6 | 0.20/0.15 | 158.9 | 145 | 136 | 12.8 |
| | 14 | 0 | — | 0.16 | 13.0 | 12.4 | 0.14/0.15 | 159.7 | 150 | 147 | 5.0 |
| | 15 | 6.5 | 0.90 | 0.38 | 24 | 11.9 | 0.22/0.15 | 141.7 | 137 | 132 | 2.8 |
| Example | 18 | 10.8 | 0.90 | 0.40 | 25 | 12.4 | 0.32/0.15 | 129.1 | 128 | 119 | 2.3 |
| | 19 | 14.2 | 0.96 | 0.35 | 4.3 | 12.7 | 0.36/0.15 | 124.2 | 123 | 116 | 2.7 |
| | 20 | 11.5 | 0.91 | 0.35 | 16.1 | 12.9 | 0.36/0.15 | 126.0 | 125 | 118 | 2.5 |

*Silica (synthetic silica available from Fuji Devison Co., Ltd.) and oleamide (available from Nippon Seika Co., Ltd.) were added as an anti-blocking agent and a lubricant, respectively, to readily peel off the contact surface of the biaxially oriented film having a size of 10 cm × 10 cm after pressing at 40° C. for 24 hours under a load of 100 g/cm². The amount of the silica added affects the haze of the film.

EXAMPLE 21

To 100 parts of the purified and dried random copolymer obtained in Example 1 above, a peroxide, 2,5-dimethyl-2,5-di(tert-butylperoxy)hexane in an amount listed in Table 4, 0.25 parts of tetrakis methylene-3-(3',5'-di-tertbutyl-4'-hydroxyphenyl)propionate methane and 0.1 parts of calcium stearate were added. Then, the mixture was blended in a Henschel mixer and pelletized through an extruder at a temperature of 240° C. The pellet thus obtained had an MFI of 9.5 g/10 min, an MLMFI/MFI of 12.3, a block index based on $C^{13}$-NMR of 0.92 and a Tm of 126.3° C.

To the pellet thus obtained, 0.40% of synthetic silica (i.e., an anti-blocking agent) and 0.25% of oleamide (i.e., a lubricant) were added and, from them, a T-die film having a thickness of 60 μm was molded by using a conventional 40 mmφ extruder with a T-die having a slit gap of 0.7 mm under the conditions of an extrusion temperature of 250° C. and a cooling roll temperature of 25° C.

The physical properties of the T-die film including a haze, ethylene content and impact strength were determined in the above-mentioned method. The results are shown in Table 4 below.

jected to the visbreaking and which had a block index and an MLMFI/MFI of larger than the upper limit of the desired range of the present invention. Comparative Example 19 is an experiment relative to a copolymer was produced by slightly vibrating the starting copolymer and which had an MLMFI/MFI larger than the upper limit of the desired range of the present invention.

EXAMPLE 25

The purified and dried copolymer obtained in Example 15 was visbroken and, then, molded to form a T-die film in the same manner as in Example 21.

The results are shown in Table 4 below.

EXAMPLE 26

The purified and dried copolymer powder obtained in Example 16 was visbroken and, then, T-die film was molded therefrom, in the same manner as in Example 21.

The results are shown in Table 4.

COMPARATIVE EXAMPLE 20

T-die film was molded in the same manner as in Example 21 by using a commerically available propylene-ethylene block copolymer (i.e., SHOALLOMER MK 311C manufactured by showa Denko Co., Ltd.) having an ethylene content of 7.4 mol %, an MFI of 5.1 g/10 min, a block index of 3.7 and an MLMFI/MFI of 19.6.

The results are shown in Table 4.

TABLE 4

| | | Ethylene content mol % | Polymer powder MFI | Peroxide part | Block index | After Visbreaking MLMFI/MFI | MFI | Amide % | Silica % | Tm °C. | Impact strength −5° C., kg cm/mm | Haze* % | Heatseal strength (g/15 mm width) |
|---|---|---|---|---|---|---|---|---|---|---|---|---|---|
| Example | 21 | 12.0 | 0.08 | 0.36 | 0.92 | 12.3 | 9.5 | 0.30 | 0.55 | 126.3 | 196 | 3.8 | >500 |

TABLE 4-continued

|  |  | Ethylene content mol % | Polymer powder MFI | Peroxide part | Block index | After Visbreaking MLMFI/MFI | MFI | Amide % | Silica % | Tm °C. | Impact strength −5° C., kg cm/mm | Haze* % | Heatseal strength (g/15 mm width) |
|---|---|---|---|---|---|---|---|---|---|---|---|---|---|
|  | 22 | 10.4 | 0.08 | 0.36 | 0.91 | 12.1 | 10.4 | 0.30 | 0.50 | 129.4 | 163 | 3.4 | >500 |
|  | 23 | 8.4 | 0.07 | 0.36 | 0.94 | 12.7 | 6.2 | 0.26 | 0.50 | 134.6 | 108 | 3.3 | 285 |
|  | 24 | 7.1 | 0.07 | 0.36 | 0.96 | 11.8 | 8.5 | 0.26 | 0.50 | 139.3 | 84 | 3.4 | 225 |
|  | 25 | 11.5 | 0.10 | 0.36 | 0.90 | 12.5 | 10.2 | 0.32 | 0.55 | 126.3 | 187 | 3.9 | >500 |
|  | 26 | 9.6 | 0.08 | 0.36 | 0.98 | 12.0 | 8.9 | 0.32 | 0.55 | 130.1 | 142 | 3.4 | 420 |
| Comparative | 16 | 5.3 | 0.07 | 0.36 | 0.94 | 12.3 | 9.7 | 0.24 | 0.55 | 144.2 | 36 | 3.6 | 142 |
| Example | 17 | 4.2 | 0.07 | 0.36 | 0.90 | 11.8 | 8.8 | 0.24 | 0.50 | 148.3 | 23 | 3.3 | 108 |
|  | 18 | 9.3 | 8.6 | 0 | 1.31 | 20.3 | 8.9 | 0.30 | 0.40 | 133.6 | 46 | 4.6 | 350 |
|  | 19 | 7.8 | 1.3 | 0.20 | 0.96 | 16.6 | 9.3 | 0.26 | 0.40 | 136.9 | 48 | 4.3 | 236 |
|  | 20 | 5.4 | 5.1 | 0 | 3.7 | 19.6 | 5.1 | 0.24 | 0.35 | 152.7 | 160 | 14.3 | 45 |

*Minimum amounts of silica and amide were added to effect easy openability property of the film.

We claim:

1. A process for producing a propylene-ethylene random copolymer comprising the steps of:
   copolymerizing propylene and ethylene in the presence of a Ziegler-type catalyst to form a random copolymer having an MFI, determined at 230° C. under a load of 2.16 kg, of 0.01 to 0.3 g/10 min; and visbreaking the resultant copolymer in the presence of a peroxide to form a random copolymer having the following characteristics:
   (a) a melting point of 115° C. to 140° C.;
   (b) an ethylene content, determined by the $C^{13}$-NMR method, of 6 to 20 mol %;
   (c) a block index, calculated according to the $C^{13}$-NMR method, of 1.1 or less;
   (d) an MFI, determined at 230° C. under a load of 2.16 kg, of 0.5 to 100 g/10 min; and
   (e) a ratio of the MLMFI, determined at 230° C. under a load of 10.0 kg, to the MFI, determined at 230° C. under a load of 2.16 kg, of 10 to 16, said peroxide having a half life-decomposition time of one second to ten minutes at the melting point of said copolymer.

2. A process as claimed in claim 1, wherein said random copolymer further contains one or more alpha-olefins having the general formula:

$$CH_2=CHR$$

wherein R is an alkyl group having 2 to 10 carbon atoms, and is produced by copolymerization of propylene with one or more said alpha-olefins in addition to ethylene.

3. A process as claimed in claim 1, wherein said copolymerization is carried out in a liquid monomer solvent 4. A process as claimed in claim 1, wherein visbreaking is carried out at a temperature of 180° C. to 300° C. in the presence of 0.002 to 0.5 parts by weight of the peroxide, based on 100 parts by weight of the copolymer.

5. The process of claim 1, wherein said peroxide is t-butyl hydroperoxide, cumene hydroperoxide, dicumyl peroxide, 2,5-dimethyl-2,5-di(t-butylperoxy)hexane, 2,5-dimethyl-2,5-di(t-butylperoxy)hexane-3, lauroyl peroxide, benzoyl peroxide, t-butylperoxy acetate, t-butylperoxylaurate, methylethyl ketone peroxide, methyl isobutyl ketone peroxide, diisopropyl peroxydicarbonate, or vinyl tris(t-butylperoxy) silane, azobisiisobutyronitrile and 2,2'-azobis(2,4-dimethyl valeronitrile).

6. The process of claim 1, wherein said visbreaking is carried out in the presence of other optional additives including anti-oxidants, lubricants, ultra violet light absorbers, coloring agents, pigments, anti-blocking agents and anti-static agents.

* * * * *